(12) United States Patent
Borrelli et al.

(10) Patent No.: US 6,175,668 B1
(45) Date of Patent: Jan. 16, 2001

(54) WIDEBAND POLARIZATION SPLITTER, COMBINER, ISOLATOR AND CONTROLLER

(75) Inventors: Nicholas F. Borrelli, Elmira; Daniel A. Nolan; Michael J. Yadlowsky, both of Corning, all of NY (US)

(73) Assignee: Corning Incorporated, Corning, NY (US)

( * ) Notice: Under 35 U.S.C. 154(b), the term of this patent shall be extended for 0 days.

(21) Appl. No.: 09/258,631

(22) Filed: Feb. 26, 1999

(51) Int. Cl.[7] ....................................... G02B 6/00
(52) U.S. Cl. .................... 385/11; 385/11; 385/1; 385/2; 385/3; 385/27; 385/28; 385/39; 385/42; 385/46; 385/123; 359/484; 359/495; 359/483; 359/485; 359/497; 359/499
(58) Field of Search ................. 385/11, 1–3, 27–28, 385/39, 42, 123, 46; 359/484, 495, 483–85, 497, 499

(56) References Cited

U.S. PATENT DOCUMENTS

| | | | |
|---|---|---|---|
| 5,071,212 | * 12/1991 | Mesaki et al. | 385/11 |
| 5,444,803 | * 8/1995 | Kim et al. | 385/28 |
| 5,611,007 | * 3/1997 | Wolf et al. | 385/14 |
| 5,671,301 | * 9/1997 | Kupershmidt | 385/1 |
| 5,721,615 | * 2/1998 | McBride et al. | 356/345 |
| 5,740,288 | * 4/1998 | Pan | 385/11 |
| 5,796,882 | * 8/1998 | Schmid | 385/11 |
| 5,933,271 | * 8/1999 | Waarts et al. | 359/341 |
| 5,946,429 | * 8/1999 | Huang et al. | 385/12 |
| 5,986,784 | * 11/1999 | Kersey et al. | 359/122 |
| 6,049,427 | * 4/2000 | Bettman | 359/484 |

* cited by examiner

Primary Examiner—Frank G. Font
Assistant Examiner—Delma R. Flores Ruiz
(74) Attorney, Agent, or Firm—Daniel P. Malley

(57) ABSTRACT

A wideband polarization splitter and combiner is fabricated using either fiber coupler technology or planar coupler technology. The device splits or combines wideband light signals without losing a substantial amount of spectral information. An antipodal phase generator is used to split a randomly polarized light signal into relatively wideband polarization components for use by polarization sensitive devices. The optical device is fabricated using polarization preserving fibers or waveguides, but it is intended for use in systems employing non-polarization-preserving fibers. The polarization splitter/combiner is also used as the basis for an isolator/circulator and a polarization controller. The polarization controller converts a randomly polarized light signal into a signal having a known and definite state of polarization.

38 Claims, 9 Drawing Sheets

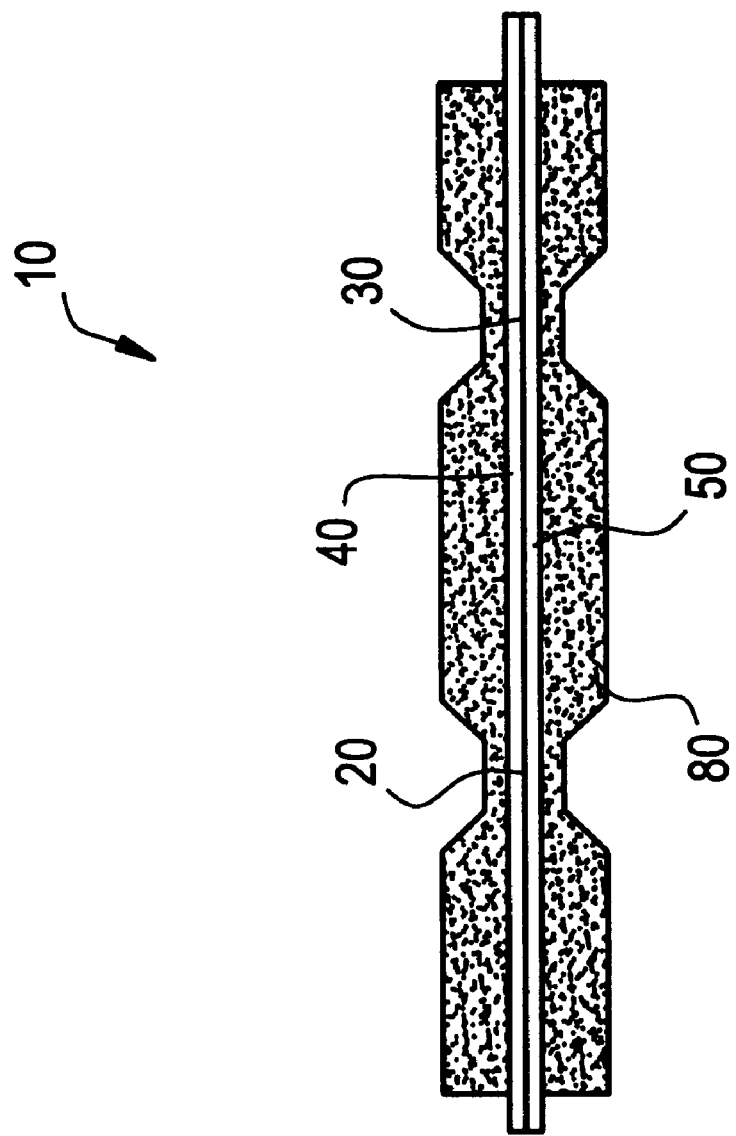

WIDEBAND POLARIZATION SPLITTER, COMBINER, ISOLATOR AND CONTROLLER

BACKGROUND OF THE INVENTION

1. Field of the Invention

The present invention relates generally to polarization splitters, combiners and isolators, and particularly to a wavelength-insensitive apparatus for splitting or combining a randomly polarized light signal.

2. Technical Background

Polarization is a critical parameter in optical communication technology. In a single mode fiber, the fundamental mode of the fiber is the solution to the wave equation that satisfies the boundary conditions at the core-cladding interface. However counterintuitive this may seem, there are two solutions to the wave equation that correspond to the fundamental mode. The fiber is deemed a single mode fiber because both solutions have the same propagation constant, at least in a perfectly cylindrical fiber. The two solutions are referred to as the polarization modes. The electric field associated with the fundamental mode is assumed to be a transverse field, with the polarization components being linearly polarized along the x and y directions. Thus, the polarization components are mutually orthogonal. As light travels down the fiber, the energy of the pulse is divided between the two polarization modes. The state of polarization refers to the distribution of light energy between the two polarization modes. In practice, since fibers are not perfectly circular, the two polarization modes have slightly different propagation constants that give rise to pulse spreading. This phenomenon is called polarization mode dispersion.

The polarization state of light travelling in a fiber optic network must be taken into account during the design. Optical fiber can be made polarization independent with respect to polarization mode dispersion, but the state of polarization can vary over all states, with respect to time, and be affected by environmental factors. A number of devices require incident light signals to be in a particular polarization state. The performance of such devices will change significantly with the state of incoming polarization. Thus, when the incident light signal is randomly polarized, the device will not function.

One approach that has been considered involves the use of polarization maintaining (PM) fibers. While PM fiber will maintain the polarization state of the light signal, it is not practical for most communications systems for several reasons. First, attenuation is always higher for PM fiber. Second, in the event that some polarization coupling does occur, polarization mode dispersion will be very high. Third, PM fiber is expensive, the cost being dependent on the degree of polarization preservation needed. Thus, PM fiber is impractical for system-wide deployment.

In another approach that has been considered, mechanical polarization controllers have been used to mechanically track the polarization over time. Usually, polarization tracking is performed in two stages. First, the state of polarization is measured. Then, the state of polarization of the receiver and the incoming light signal are adjusted to coincide. Mechanical polarization controllers are used in laboratories throughout the world to conduct telecommunications experiments. However, these devices are largely confined to the laboratory. Even under laboratory conditions these devices have several drawbacks. Mechanical polarization controllers are not robust and require constant supervision to ensure that they are in good working order. Even when the device is working properly, the polarization state must be tracked mechanically over time and there is no straight forward way to do this because there is no tap available. This makes direct monitoring of the state of polarization difficult if not impossible.

In yet another approach that has been considered, polarized light splitters have been used to provide polarization sensitive devices with light signals having known polarization states. Polarized light splitters consist of an input beam splitter connected to a resonant structure, which is connected to an output beam splitter. The input beam splitter divides the light signal into parallel and perpendicular components which are then routed into the resonant structure. Light that is at or near the resonant wavelength is rotated by the resonant structure to a known polarization state. However, light that is not at or near the resonant wavelength passes through the resonant structure unchanged. The output beam splitter recombines the components into a light signal having a known polarization state. This light signal is available for use by the polarization sensitive receiver. Unfortunately, resultant light signal is very narrow-band and only a few wavelengths wide because the spectral components of the signal not at or near the resonant wavelength have been filtered out. This method is also expensive.

Thus, a need exists for a wavelength-insensitive polarization splitter/combiner that can be used to split or combine wide-band polarized light signals, without loss of spectral information, in communications systems having polarization-sensitive components. Especially in systems where cost is a major issue, such as in local or metropolitan area networks.

SUMMARY OF THE INVENTION

The present invention provides a robust, inexpensive, and relatively wavelength insensitive polarization splitter/combiner that addresses the needs discussed above. A splitter/combiner is disclosed that can be fabricated using either fiber or planar technology. Light is split into orthogonal and parallel components. The polarization components can then be used by polarization-sensitive devices such as sensors, or amplifiers, before being recombined. The splitter/combiner of the present invention is also used as the basis for an isolator, circulator, and polarization controller.

One aspect of the present invention is an optical device for directing a polarized light signal having mutually orthogonal polarization components. The optical device including a first port, a second port, a third port, and a fourth port. The optical device also includes: an antipodal phase generator for generating a first antipodal phase signal to selectively interfere with the first component and a second antipodal phase signal to selectively interfere with the second component, such that the polarized light signal is directed to the first port, the first component is directed to the third port and the second component is directed to the fourth port without a substantial loss of spectral information.

In another aspect, the present invention includes a method for directing a polarized light signal, a first component and a second component, wherein the first component and the second component are mutually orthogonal polarization components of the polarized light signal in an optical device including a first port, a second port, a third port, and a fourth port. The method includes the steps of: providing an antipodal phase generator connected to the first port, the second port, the third port, and the fourth port, for processing the polarized light signal, the first component and the second component; generating at least one antipodal phase signal from an in-phase signal comprising either the first component or the second component; and subtracting the antipodal phase signal from the in-phase signal, wherein the polarized light signal is directed to the first port, the first component is directed to the third port, and the second component is directed to the fourth port without a substantial loss of spectral information.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIG. 3 is an example of a fiber coupler implementation of the first embodiment of the present invention;

DETAILED DESCRIPTION OF THE PREFERRED EMBODIMENTS

Figure 1:
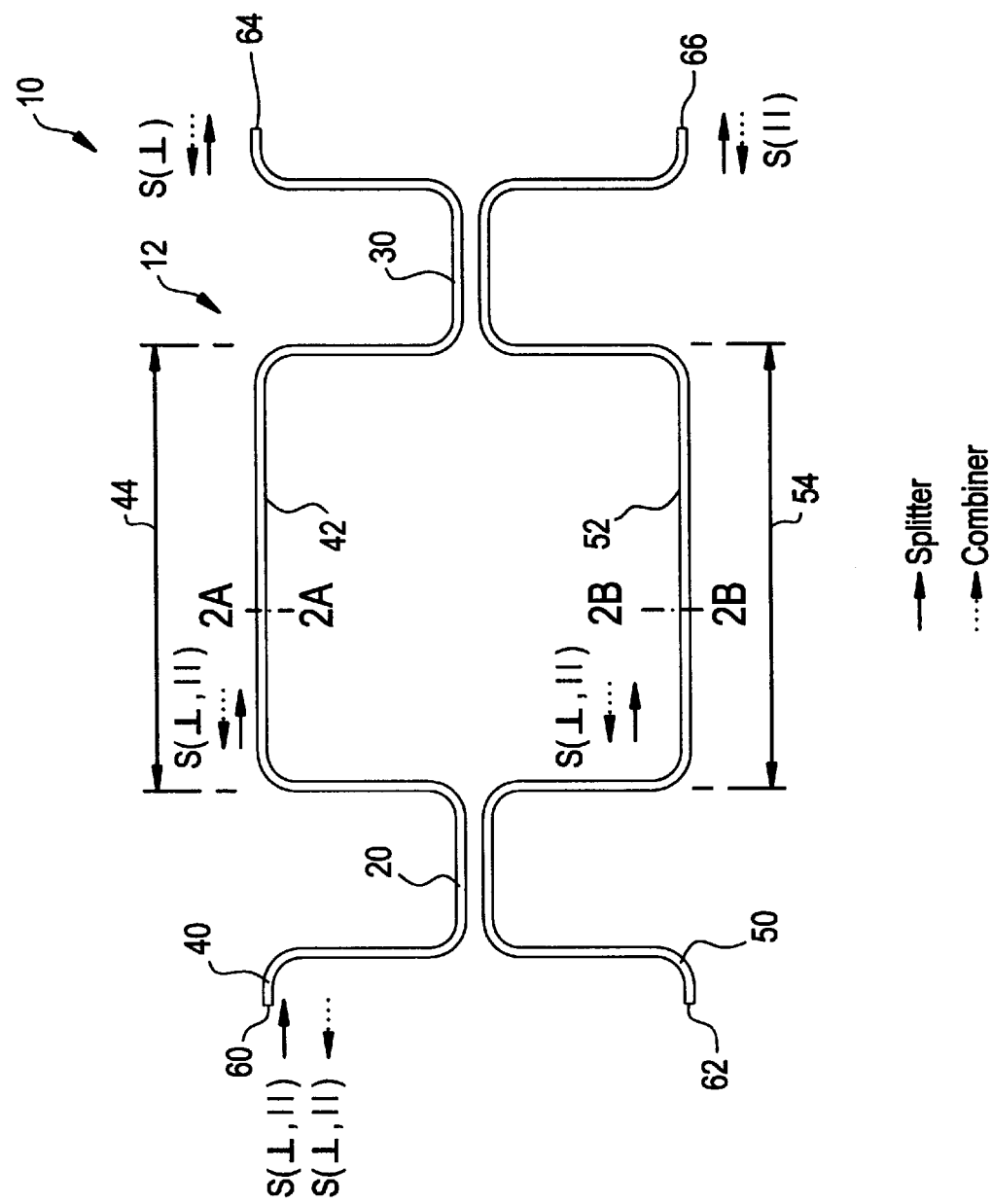
FIG. 1 is a plan view of a polarization splitter/combiner in accordance with the first embodiment of the present invention.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the polarization splitter/combiner of the present invention is shown in FIG. 1, and is designated generally throughout by reference numeral 10.

In accordance with the present invention, a wideband polarization splitter/combiner 10 includes an antipodal phase generator 12 for processing an incident polarized light signal. The antipodal phase generator 12 splits the polarized light signal into parallel and orthogonal components. In one optical path 52, the parallel polarization component is phase delayed an odd multiple of $\pi$ radians with respect to the parallel component propagating in the other path 42, to thereby create antipodal signals. On the other hand, the orthogonal components in both optical paths are in-phase. When the components are combined in coupler 30, the parallel components are 180° out of phase and subtract because of destructive interference. As a result, wideband splitter/combiner 10 directs the orthogonal component of the polarized light signal out of port 64 and the parallel component of a polarized light signal out port 66. Depending on the configuration, either component can be phase delayed, but not both. Since the antipodal phase generator 12 is not tuned to any resonant frequency, the resultant orthogonal and parallel components are wideband light signals. Thus, the present invention provides a robust, inexpensive, and relatively wavelength independent polarization splitter/combiner 10 that provides light having a known polarization state to polarization-sensitive devices such as sensors, amplifiers, or receivers. The wideband splitter/combiner 10 of the present invention is also used as the basis for an isolator, circulator, and a polarization controller. The present invention can be fabricated using either fiber or planar technology.

As embodied herein, and depicted in FIG. 1, antipodal phase generator 12 is a Mach-Zehnder that includes coupler 20 which is connected to ports 60 and 62. Coupler 20 is connected to optical arm 42 and optical arm 52. Optical arm 42 and optical arm 52 are connected to coupler 30. Coupler 30 is connected to ports 64 and 66. Optical arm 42 has a predetermined length 44 and optical arm 52 has a predetermined length 54.

Figure 2B:
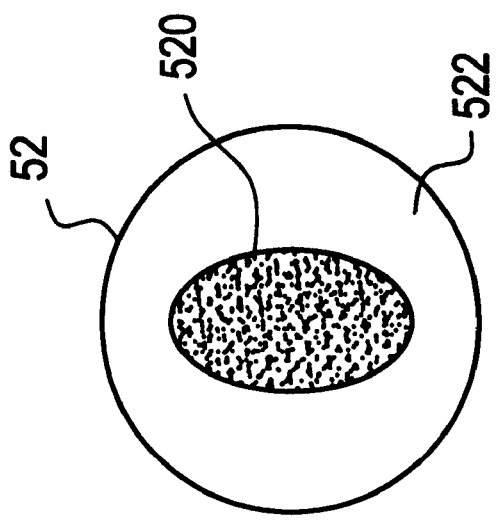
FIGS. 2A and 2B are cross-sectional views of the first and optical arms taken through line X—X in FIG. 1.
Figure 2A:
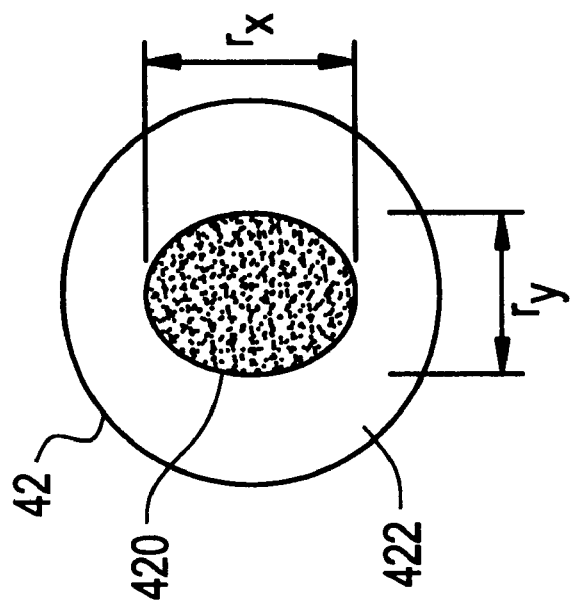

As embodied herein and depicted in FIG. 2, a cross-sectional view of the first and optical arms taken through line X—X in FIG. 1 is shown. Optical arm 42 includes an elliptical core 420 and a first cladding 422. Optical arm 52 includes a elliptical core 520 and cladding 522. The ellipticities of core 420 and core 520 are different and play an important function in the design of antipodal phase generator 12.

Antipodal phase generator 12 may be of any suitable well-known type, but there is shown by way of example, a Mach-Zehnder device that is formed from polarization maintaining (PM) optical fiber 40 and polarization maintaining(PM) optical fiber 50. Elliptical core 420 has an ellipticity characterized by a long axis, $r_{x1}=4$ $\mu$m and a short axis $r_{y1}=1$ $\mu$m. Elliptical core 520 has an ellipticity characterized by a long axis, $r_{x2}=3.3$ $\mu$m and a short axis $r_{y2}=1.2$ $\mu$m. Optical arm lenghts 44 and 54 are approximately equal to 1 cm. The core-cladding relative index of fiber 40, $\Delta_1=2.0\%$ and core-cladding relative index of fiber 50, $\Delta_2=2.0\%$. The elipticities and the relative indexes determine the propagation constants and hence, the generation of the antipodal phase signal. As one of ordinary skill in the art will appreciate, various combinations of these parameters can be used to generate the antipodal phase signal. The antipodal phase generator 12 is also implemented using planar waveguides. Both of these alternate embodiments will be discussed below in more detail. In a planar arrangement, core 420 and 520 have approximately circular cross-sections in coupling regions 20 and 30. This is necessary to provide polarization maintainance. Outside of coupling regions 20 and 30, cores 420 and 520 are elliptical as described above.

The operation of polarization splitter/combiner 10, as depicted in FIGS. 1 and 2 is as follows. As shown in FIG. 1, when used as a splitter, a randomly polarized light signal is directed into port 60. The polarized light signal is coupled into arms 42 and 52 by coupler 20. Before the light from arm 42 and arm 52 enters coupler 30, arm 42 carries the parallel polarization component and arm 52 carries a parallel polarization component that is phase shifted π radians with respect to the parallel component in arm 42. Thus, antipodal phase signals of the parallel polarization component are generated. Coupler 30 has a subtractive effect. When the parallel antipodal signals are coupled, they perfectly interfere with each other and the parallel polarization component is destroyed due to destructive interference. Thus, only the orthogonal polarization component appears at port 64. The opposite effect occurs with respect to the orthogonal polarization component and only the parallel component appears at port 66.

When used as a combiner, an orthogonally polarized light signal is directed into port 64 and a parallel polarized light signal is directed into port 66. One of ordinary skill in the art will recognize that optical device 10 is bidirectional and operates in reverse fashion from what was described with respect to the splitter. Each polarization component is coupled into arms 42 and 52. Arms 42 and 52 generate antipodal signals before directing the light into coupler 20. Thus, the polarized light signal appears at port 60 because of the constructive interference and no signal appears at port 62 because of the destructive interference of the antipodal signals generated and subsequently combined in coupler 20.

The operating principles of the present invention that establish the relationship between the signal power output at each port and the ellipticities, the relative indexes, and the propagation constants in each fiber arm are as follows.

$$\beta_i = kn_1 \sqrt{1 - \frac{2\Delta}{(V_x V_y)^{\frac{1}{2}}} \left[ \left(\frac{Rx}{Ry}\right)^{\frac{1}{2}} + \left(\frac{Ry}{Rx}\right)^{\frac{1}{2}} \right]^{\frac{1}{2}}} \quad (1)$$

where $\beta_i$ is the propagation constant for a elliptical core fiber. The polarization correction for the propagation constants are:

$$\Delta\beta_{xi} = \frac{-(2\Delta)^{\frac{3}{2}}}{2 R_x V_x} \quad (2)$$

$$\Delta\beta_{yi} = \frac{-(2\Delta)^{\frac{3}{2}}}{2 R_y V_y} \quad (3)$$

Thus, the propagation constants for each polarization are given by:

$$\beta_{xi} = \beta_i + \Delta\beta_{xi} \quad (4)$$

$$\beta_{yi} = \beta_i + \Delta\beta_{yi} \quad (5)$$

where x and y are the polarization directions, the index i refers to the first or second fiber, $R_x$ and $R_y$ are the cross-sectional length and width dimensions of the elliptical core, $k=2\pi/\lambda$ where λ is the wavelength of the light signal, and $V_x$ and $V_y$ are fiber parameters. Fiber parameters $V_x$ and $V_y$ are a function of k, $R_x$, $R_y$, the index of the core and the relative index of the core and clad. Finally, the polarization component signal power propagating out of the device is given by the equations:

$$P_{xi} = \sin^2[(\Delta\beta_{x1} - \Delta\beta_{x2}) Z_i] \quad (6)$$

$$P_{yi} = \sin^2[(\Delta\beta_{y1} - \Delta\beta_{y2}) Z_i] \quad (6)$$

where $Z_i$ is the length of the arms. Thus, the ellipticities, the relative indexes, and the propagation constants are chosen such that in a given port the signal power for one of the components is zero. For example, the signal power directed out of the first output port for each polarization component is $P_{x1}=SP_1$, and $P_{y1}=0$, wherein $SP_1$, the signal power coming out the first port, is polarized in the x-direction. The signal power directed out of the second output port for each polarization component is $PX_2=0$ and $P_{y2}=SP_2$, wherein $SP_2$, the signal power coming out the second port is polarized in the y-direction. Obviously, the parameters could be chosen so that the y-polarization comes out the first port and the x-polarization component comes out the second port. Theoretically, in the above example the arms are designed such that $P_{y1}$ and $P_{x2}$ are completely canceled. However, in practice there will be a negligible signal power associated with these components. There will be at least a 20dB difference between $P_{X1}$ and $P_{y1}$ and between $P_{y2}$ and $P_{x2}$, over a wide range of wavelengths. This will be discussed in more detail below with respect to FIG. 5. It is important to note that although the $\beta_{xi}$ terms do have some wavelength dependence by virtue of the term $k=2\pi/\lambda$, there is no band limiting function or pass band filtering function present in equations (1) through (7) that would act to filter out or strip away spectral information when splitting a polarized light signal.

The polarization splitter/combiner 10 of the first embodiment of the present invention may be of any suitable well-known type, but there is shown by way of example in FIG. 3, a fiber coupler implementation. In this embodiment, the first optical waveguide 40 and second optical waveguide 50 are phase maintaining (PM) optical fibers, each having an elliptical core and cladding, as shown in FIG. 2. Both fibers 40 and 50 are disposed within a glass tube which is heated and collapsed around he fibers to form overclad 80. The heated device is then drawn to reduce the diameter hereof, to form evanescent couplers 20 and 30. However, it should be noted that the communications system environment within which the splitter/combiner operates does not use PM fibers.

Figure 4:
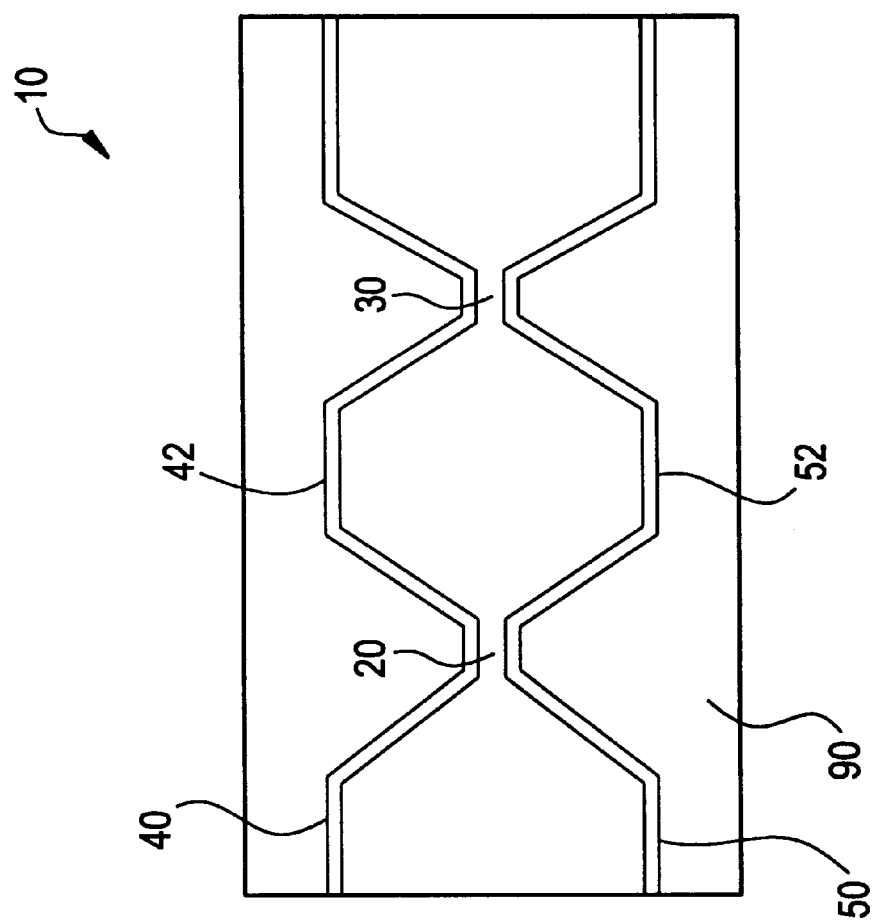
FIG. 4 is an example of a planar coupler implementation of the first embodiment of the present invention.

In an alternate embodiment of the present invention, as embodied herein and as shown in FIG. 4, the polarization splitter/combiner 10 of the first embodiment of the present invention shown in FIG. 1 can be implemented using a planar coupler arrangement. Coupler 20 is formed by disposing the first optical waveguide 40 and second optical waveguide 50 in close proximity to one another such that the evanescent field of the mode propagating in waveguide 40 enters waveguide 50. Coupler 30 is formed in like manner. In the planar coupler implementation, the first optical waveguide 40 and second optical waveguide 50 are phase maintaining waveguides that are formed from a wafer having an underclad layer and a waveguide core layer deposited on substrate 90. The waveguide structure can be formed using standard photolithographic techniques. However, it will be apparent to those of ordinary skill in the pertinent art that modifications and variations can be made in implementing the planar arrangement shown in FIG. 4. For example, UV beam illumination, ion implantation or any suitable technique may be employed. The Lengths L of optical arms 42 and 52 are implemented as part of the photolithographic process described above.

Figure 5:
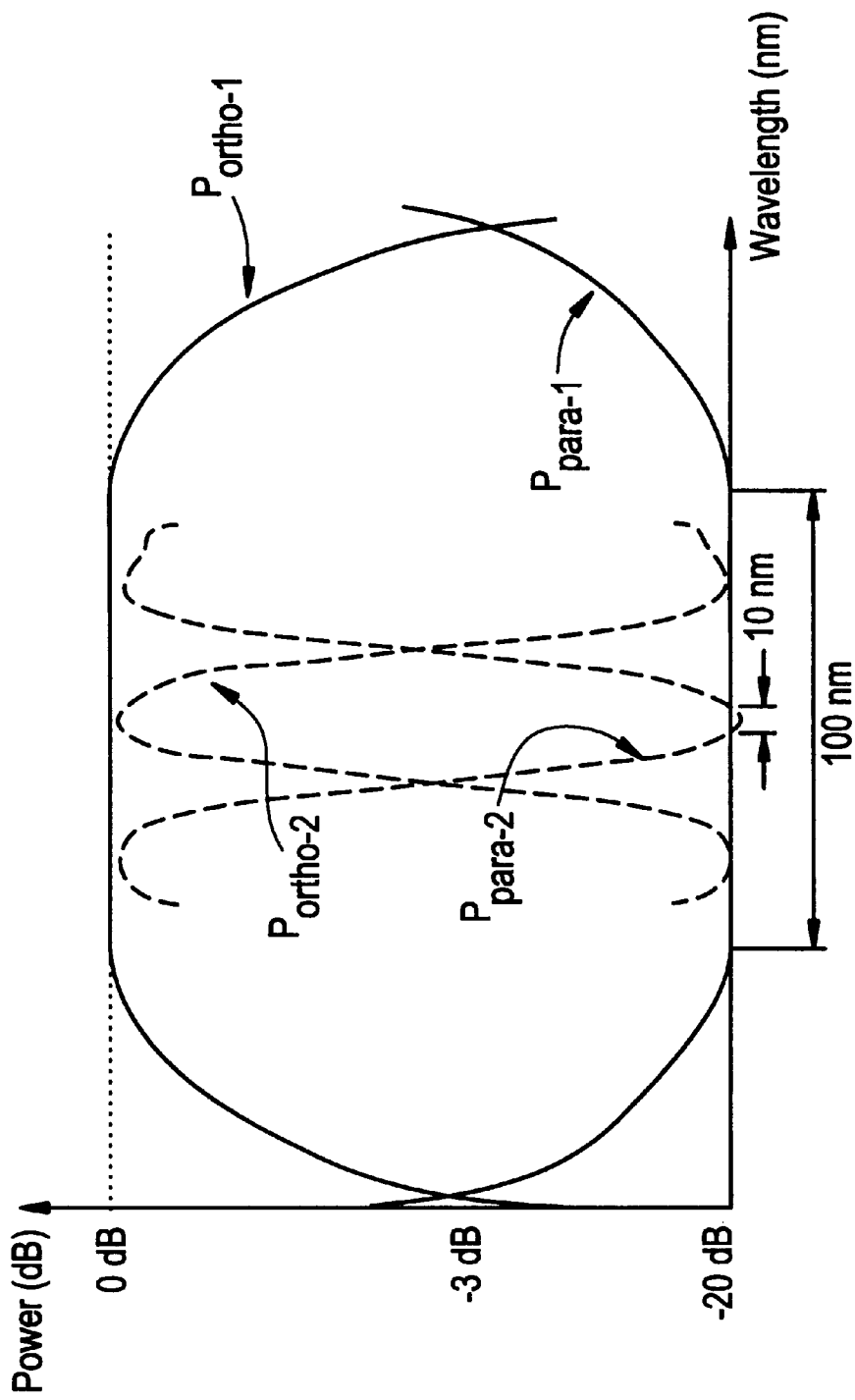
FIG. 5 is a chart comparing the extinction ratio with the spectral bandwidth to illustrate the relative wavelength insensitivity of the optical device of the present invention.

FIG. 5 is a chart showing the wavelength insensitivity of optical device 10 of the present invention. The chart shows a bandwidth comparison between the present invention and resonant beam splitter devices with respect to the extinction ratio. Resonant beam splitter devices have a bandwidth from a few nanometers to approximately ten nanometers. Optical device 10 of the present invention is relatively wavelength independent. There is a 20 dB separation between the orthogonal component and the parallel component over a bandwidth range of at least 100 nm.

Figure 6:
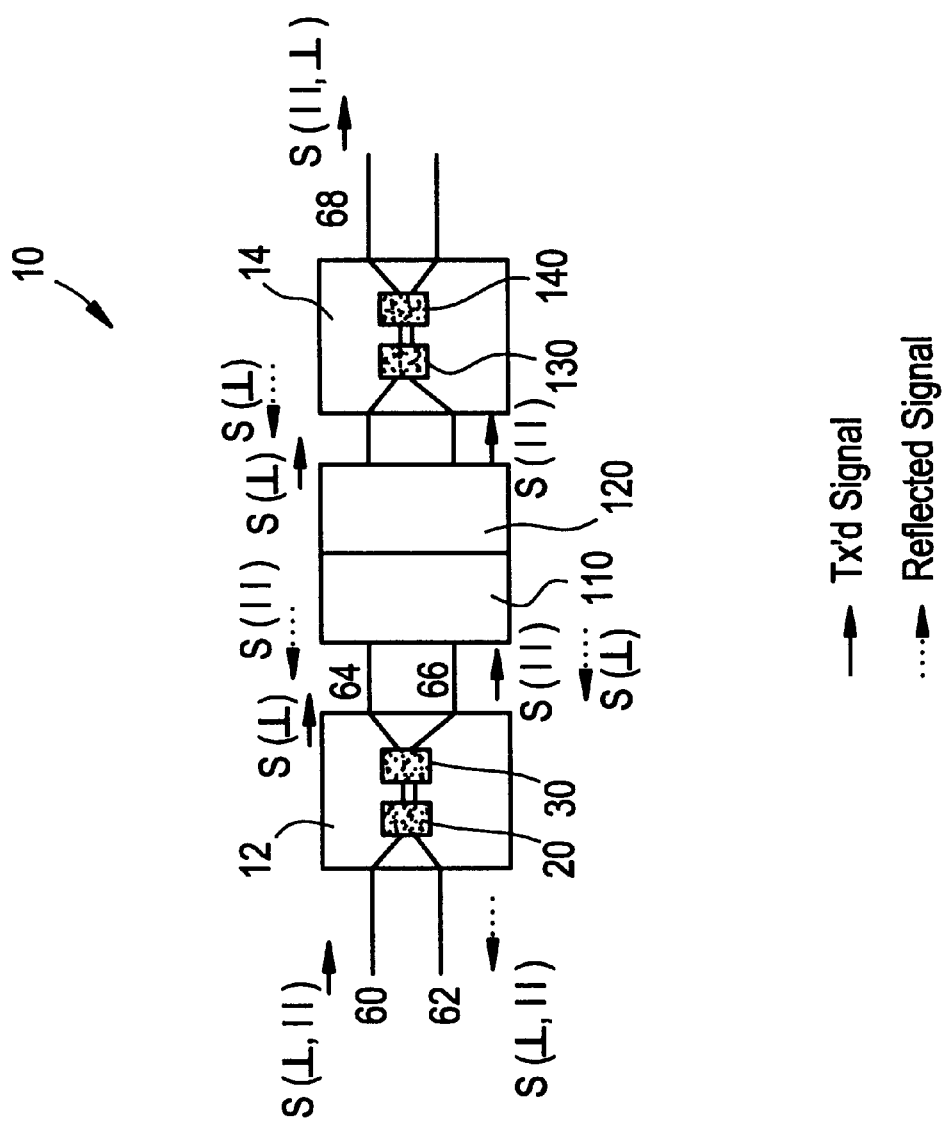
FIG. 6 is a plan view of an isolator/circulator in accordance with an alternate embodiment of the present invention.

In a second embodiment of the invention, as embodied herein and as shown in FIG. 6, a plan view of an isolator/circulator is disclosed. Antipodal phase generator 12 is connected to half-waveplate 110. The half-waveplate 110 rotates incident polarized light signals by 22.5°. Half-waveplate 110 is connected to a non-reciprocal rotator element 120. The non-reciprocal rotator element 120 is connected to a second antipodal generator 14 that is in turn, connected to port 68.

Antipodal phase generator 14 may be of any suitable well-known type, but there is shown by way of example, a Mach-Zehnder device that is formed from polarization maintaining (PM) optical fiber 40 and polarization maintaining(PM) optical fiber 50. Elliptical core 420 has an ellipticity characterized by a long axis, $r_{x1}=4$ μm and a short axis $r_{y1}=1$ μm. Elliptical core 520 has an ellipticity characterized by a long axis, $r_{x2}=3.3$ μm and a short axis $r_{y2}=1.2$ μm. Optical arm lenghts 44 and 54 are approximately equal to 1 cm. The core-cladding relative index of fiber 40, $\Delta_1=2.0\%$ and core-cladding relative index of fiber 50, $\Delta_2=2.0\%$. Antipodal generator 14 is identical to antipodal generator 12 and operates as the combiner described above.

The non-reciprocal rotator element 120 may be of any suitable well-known type, but there is shown by way of example, a Farady rotator that non-reciprocally rotates a polarized light signal by 45°. If the rotated signal is reflected back to element 120, it will be rotated an additional 45°. This rotation is non-reciprocal because it does not cancel the first rotation. Thus, the reflected signal will be rotated by 90° with respect to the incident light signal.

The operation of Isolator/circulator 10, as depicted in FIG. 6 is as follows. A randomly polarized light signal is directed into exterior port 60. Antipodal phase generator 12 operates as the splitter described above, such that an orthogonal polarization component exits exterior port 64 and a parallel polarization component exits exterior port 66. The half wave-plate 110 rotates both signals 45°. The non-reciprocal rotating element also rotates both polarization components an additional 45° and the signals are input to antipodal phase generator 14. Antipodal phase generator 14 combines the orthogonal and parallel components as described above with respect to the first embodiment of the present invention. Thus, the polarized light signal is directed into port 68. The function of an isolator is to keep unwanted reflections from propagating back through exterior port 60 and damaging transmitters and other devices. Thus, when a reflected signal propagates back through the Faraday rotator it is non-reciprocally rotated and the reflected parallel component is directed toward exterior port 64 and the reflected orthogonal component is directed toward exterior port 66. Antipodal phase generator 12 produces antipodal signals for each component such that both reflected polarization components are destroyed by destructive interference and do not appear at exterior port 60.

On the other hand, antipodal phase generator combines the orthogonal and parallel components through constructive interference and a reflected polarization signal having both components appears at port 62. This illustrates the circulator functionality of device 10, by making the reflected signal available for use by the system at port 62.

Figure 7:
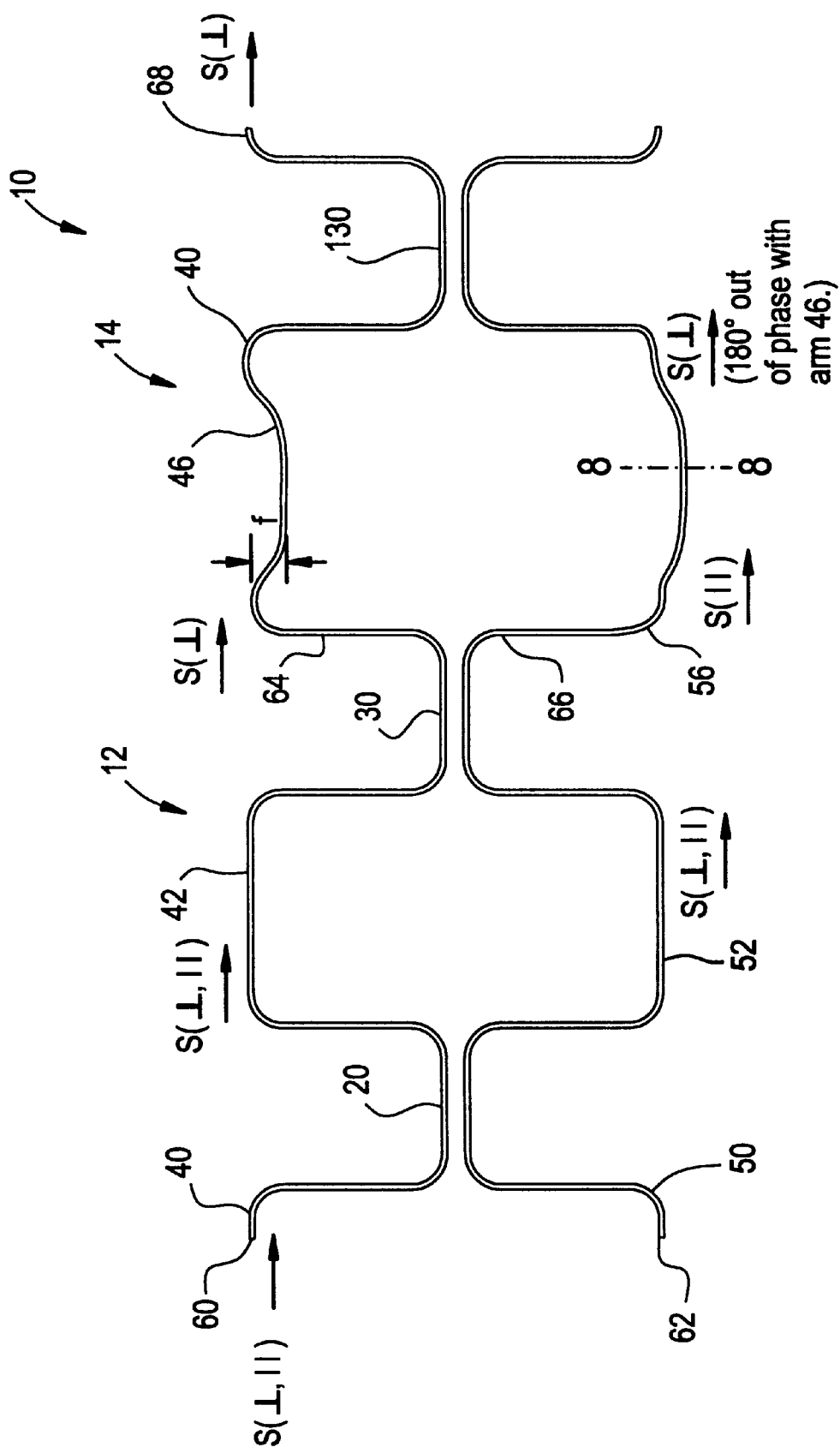
FIG. 7 is a plan view of a polarization controller in accordance with another embodiment of the present invention.

In yet another embodiment of the invention, as embodied herein and as shown in FIG. 7, a plan view of a polarization controller 10 is disclosed. Antipodal phase generator 12 is connected to arm 46 at exterior port 64 and to arm 56 at exterior port 66. Optical arms 46 and 56, respectively, are connected to a third coupler 130. Coupler 130 is connected to port 68. In polarization controller 10, antipodal phase generator 12 is identical to one described with respect to the first embodiment described above, and depicted in FIGS. 1 and 2.

In FIG. 7, both arms 46 and 56 of phase shifting element 14 include flexure "f" which is approximately 0.1 mm. This flexure introduces a 180° phase delay between arm 46 and arm 56 causing the light from both arms 46 and 56 to couple into exterior port 68. During fabrication, the 0.1 mm flexure is fine tuned by monitoring the light power output from arm 56 with a servo mechanism. Arms 46 and 56 are flexed until the power out equals zero. Note that the third optical arm 46 is a portion of PM optical fiber 40. Thus, in a fiber version of the device, arms 42 and 46 are fabricated from the same fiber and hence, have the same core, cladding, and propagation constants.

Figure 8:
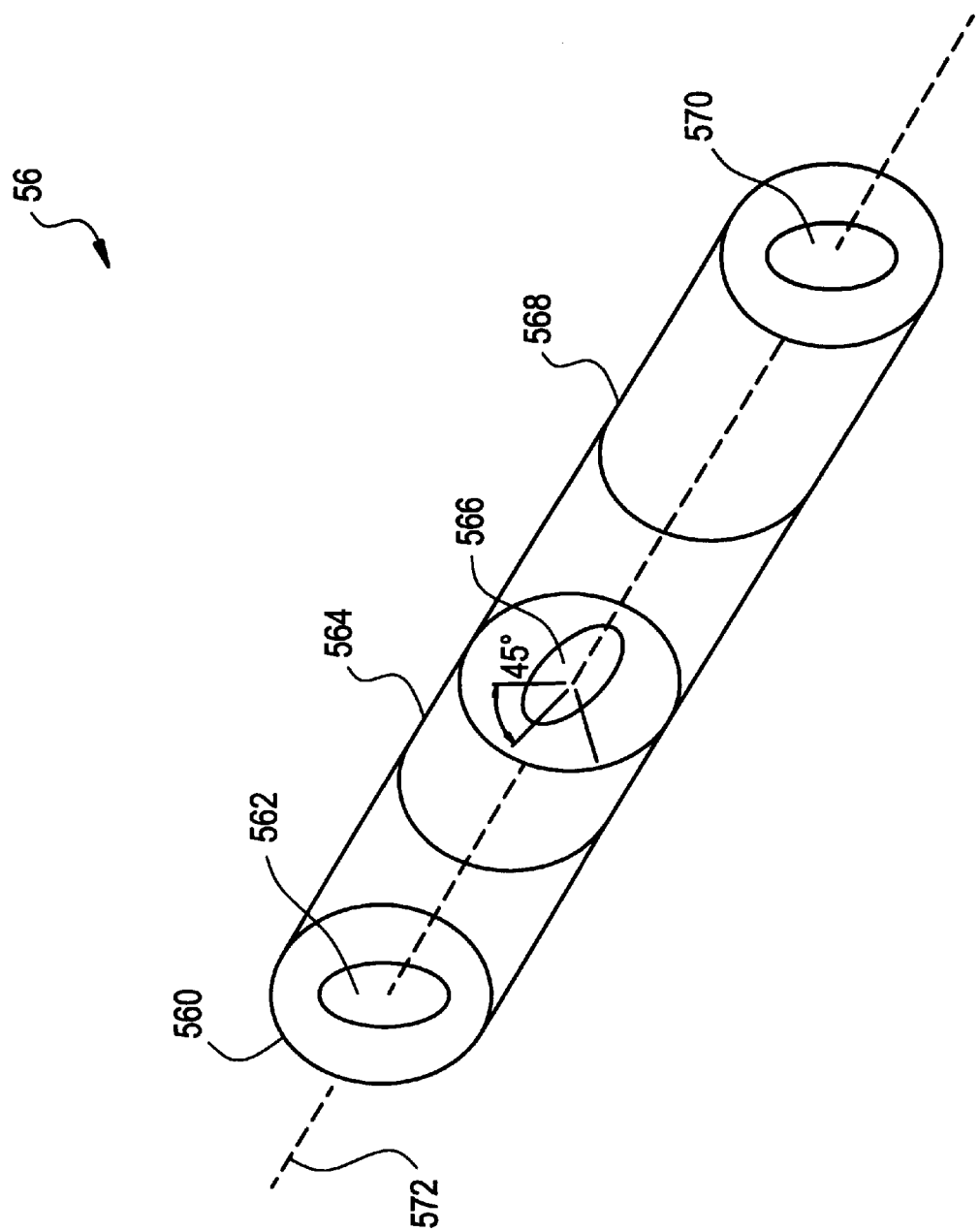
FIG. 8 is a cross-sectional view of the fourth optical arm in a fiber embodiment of the polarization controller taken through line Y—Y in FIG. 7.

As embodied herein and depicted in FIG. 8, a cross-sectional view of optical arm 56 taken through line Y—Y in FIG. 7 is shown. The optical arm includes segment 560 which has an elliptical core 562, centered around the optical axis 572 of optical arm 56. Segment 560 is connected to a middle segment 564, which also has an elliptical core 566. Core 566 is rotated around optical axis 572, 45° with respect to core 562. Segment 564 has a length equal to one beat length of the polarized signal and is connected to segment 568, which also has an elliptical core 570. Core 570 is aligned with core 562 and not rotated around axis 572. As one of ordinary skill in the art will appreciate, optical arm 56 acts to alter the optical path length and rotate the signal 45° for one beat length. Optical arm 56 is fabricated by cutting PM optical fiber 50 and splicing middle segment 564 into arm 56.

Figure 9:
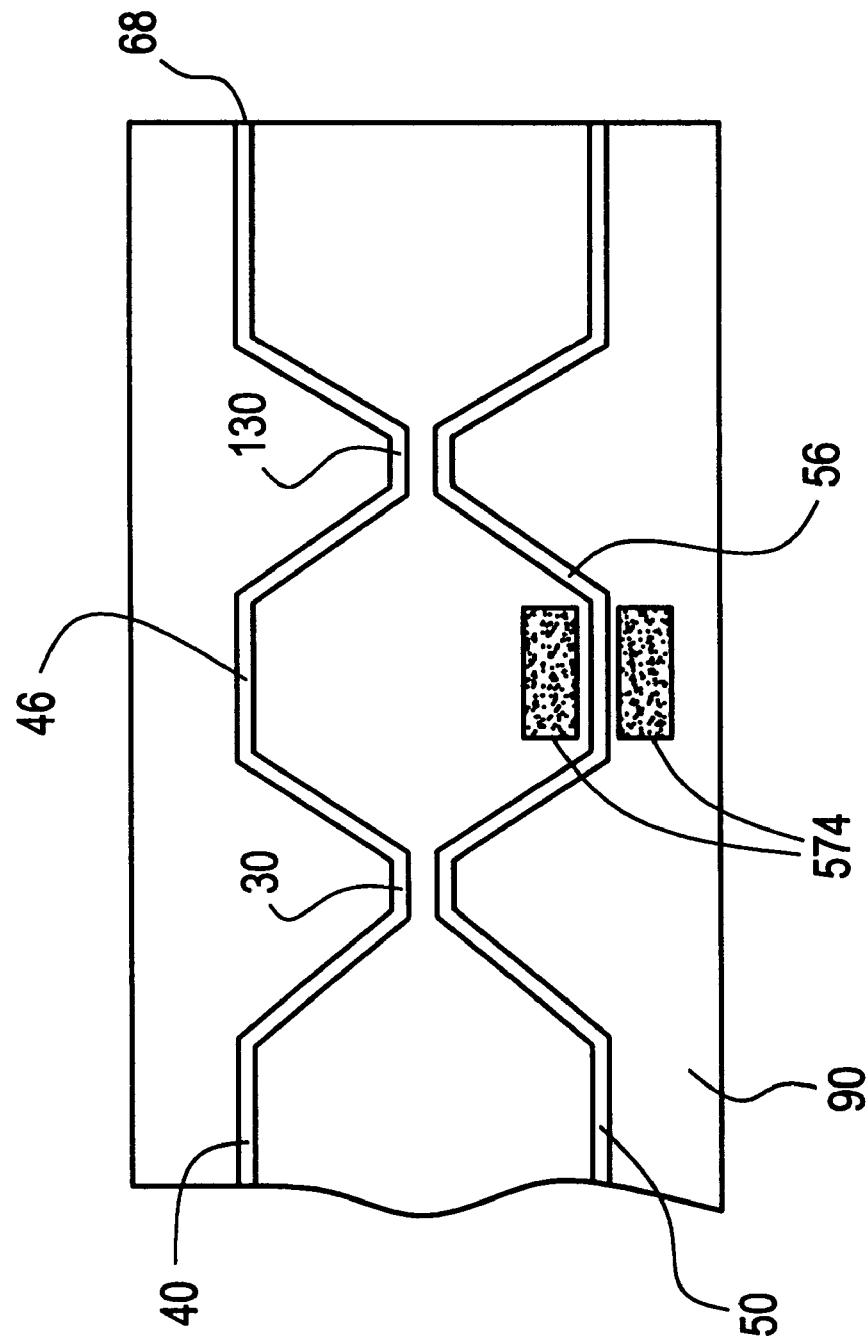
FIG. 9 is a detail view of a heater element on the fourth optical arm in a planar embodiment of the polarization controller shown in FIG. 7.

An alternative planar embodiment of the polarization controller, as embodied herein and as shown in FIG. 9 is disclosed. FIG. 9 is a detail view of a heater element on the fourth optical arm. It performs the same function in the planar embodiment as does the segmented fourth arm in the fiber coupler embodiment. As discussed above with respect to the planar implementation of the first embodiment, the first optical waveguide 40 and second optical waveguide 50 are formed from a wafer having an underclad layer and a waveguide core layer deposited on substrate 90. The waveguide structure can be formed using standard photo-lithographic techniques. However, it will be apparent to those of ordinary skill in the pertinent art that modifications and variations can be made in implementing the planar arrangement shown in FIG. 5. For example, UV beam illumination, ion implantation or any suitable technique may be employed.

In order to obtain the same effects produced by the flexure and the segmented fiber 56 in the fiber coupler version, heater electrode 574 is deposited near arm 56. As one of ordinary skill in the art will recognize, when heat is applied, the refractive index of arm 56 changes in accordance with its dn/dT coefficient. The change in index results in a change in the optical path length and the phase of the signal propagating in the waveguide is altered. In this case, the material of the fourth optical arm is chosen to rotate a given signal 45° for one beat length and cause a 180° delay between arm 46 and arm 56.

Polarization controller depicted in FIGS. 7—9 operates as follows. A randomly polarized light signal is directed into port 60. Antipodal phase generator 12 operates as the splitter described above with respect to the first embodiment, such that an orthogonal polarization component exits coupler 30 and is directed into the third optical arm 46. In similar fashion, the parallel polarization component exits coupler 30 and is directed into the fourth optical arm 56. The orthogonal component propagates in the third arm 46 and is directed into coupler 130. The parallel polarization component propagates in optical arm 56 and is rotated 45° by the middle segment 564 in the fiber coupler embodiment or, by the heater in the planar embodiment. Because of constructive interference, an orthogonally polarized light signal exits the polarization controller at exterior port 68. Thus, the polarization controller takes a randomly polarized light signal and outputs a light signal having a known polarization.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An optical device for directing a polarized light signal, and a first polarization component and a second polarization component which are mutually orthogonal polarization components of said polarized light signal, said optical device including a first port, a first component port, and a second component port, said optical device comprising:

an antipodal phase generator connected to the first port, the first component port, and the second component port, for generating a first antipodal phase signal to selectively interfere with the first polarization component and a second antipodal phase signal to selectively interfere with the second polarization component to thereby cause a relationship to exist, wherein the polarized light signal propagates in the first port, the first polarization component propagates in the first component port and the second polarization component propagates in the second component port without a substantial loss of spectral information.

2. The optical device according to claim 1, wherein the polarized light signal is directed into the optical device through the first port and split into the first polarization component and the second polarization component by the antipodal phase generator, causing the first polarization component to be directed out of the first component port and the second polarization component to be directed out of the second component port.

3. The optical device according to claim 1, wherein the first polarization component is directed into the first component port and the second polarization component is directed into the second component port and combined by the antipodal phase generator to thereby form the polarized light signal and direct it out of the first port.

4. The optical device according to claim 1, wherein the polarized light signal, the first polarization component and the second polarization component have a bandwidth of at least 100 nm when being directed out of the optical device.

5. The optical device according to claim 4, wherein the first polarization component and the second polarization component have an extinction ratio of at least 20 dB within the bandwidth when being directed out of the optical device.

6. The optical device according to claim 1, wherein the antipodal phase generator is a first Mach-Zehnder device.

7. The optical device according to claim 6, wherein the first Mach-Zehnder device to further comprises:

a first arm connected to the first port and the first component port and having a first elliptical core, a first relative index, and a first propagation constant; and a second arm connected to the second component port and having a second elliptical core different from said first elliptical core, a second relative index different from said first relative index, and a second propagation constant different from said first propagation constant, wherein a path length difference is created, generating the first antipodal phase signal and the second antipodal phase signal.

8. The optical device according to claim 7, wherein the first arm has a first predetermined length, a first predetermined parallel polarization constant, and a first predetermined orthogonal polarization constant that cause the second polarization component to phase shift an even multiple of $\pi$ radians and the first polarization component to phase shift an odd multiple of $\pi$ radians.

9. The optical device according to claim 7, wherein the first elliptical core has a first dimension of approximately 4 $\mu$m and a second dimension of approximately 1 $\mu$m.

10. The optical device according to claim 7, wherein the first relative index is approximately equal to 2.0%.

11. The optical device according to claim 7, wherein the second arm has a second predetermined length, a second predetermined parallel polarization constant, and a second predetermined orthogonal polarization constant that cause the first polarization component to phase shift an even multiple of $\pi$ radians and the second polarization component to phase shift an odd multiple of $\pi$ radians.

12. The optical device according to claim 7, wherein the second elliptical core has a first dimension of approximately 3.3 $\mu$m and a second dimension of approximately 1.2 $\mu$m.

13. The optical device according to claim 7, wherein the second relative index is approximately equal to 2.0%.

14. The optical device according to claim 7, wherein the optical device is comprised of a planar substrate.

15. The optical device according to claim 14, wherein the first arm and the second arm further comprise:

a first coupling region, wherein the first arm and the second arm each have a core that is approximately circular in said first coupling region to thereby maintain a polarization state; and a second coupling region, wherein the first arm and the second arm each have a core that is approximately circular in said second coupling region to thereby maintain a polarization state.

16. The optical device according to claim 7, wherein the first arm and the second arm are phase-maintaining optical fibers.

17. The optical device according to claim 7, wherein the first Mach-Zehnder device comprises a first fiber coupler and a second fiber coupler.

18. The optical device according to claim 7, further comprising:

a second port connected to the second arm;

a half-waveplate connected to the first component port and the second component port, wherein said half-waveplate rotates the first polarization component and the second polarization component 45°;

a non-reciprocal rotator element connected to said half-waveplate for non-reciprocally rotating the first polarization component and the second polarization component approximately 45°, wherein a reflected first polarization component and a reflected second polarization component passing through said non-reciprocal rotator element are rotated 90° with respect to the first polarization component and the second polarization component, respectively, and a reflected polarized light signal is unable to propagate in the first port due to destructive interference; and a second Mach-Zehnder device connected to said non-reciprocal rotator element, wherein the polarized light signal exits the optical device from said second Mach-Zehnder device.

19. The optical device according to claim 18, wherein the reflected polarized light signal exits the second port.

20. The optical device according to claim 7, further comprising:

a third optical arm connected to the first component port for propagating the first polarization component, wherein said third arm includes a third elliptical core, a third relative index, and a third propagation constant;

a polarization rotation arm connected to the second component port for rotating a polarization state of the second polarization component to match a polarization state of the first polarization component; and a coupler connected to said third optical arm and said polarization rotation arm, said coupler includes an output port for directing either of the first polarization component or the second polarization component into said output port such that the optical device outputs a light signal having a predetermined state of polarization.

21. The optical device according to claim 20, wherein the polarization rotation arm further comprises:

a first segment having an optical axis and connected to the second component port, wherein said first segment has a first segment elliptical core;

a second segment connected to said first segment, wherein said second segment has a second segment elliptical core rotated around the optical axis 45° with respect to said first segment elliptical core; and a third segment connected to said second segment and the third coupler, wherein said third segment is not rotated around the optical axis, being aligned with respect to said first segment elliptical core.

22. The optical device according to claim 21, wherein the second optical segment has a length equal to a beat length of the polarized light signal.

23. The optical device according to claim 22, wherein the first Mach-Zehnder and the coupler comprise an integrated device implemented using fiber couplers.

24. The optical device according to claim 23, wherein the first arm, the second arm, the third arm, and the polarization rotation arm are comprised of polarization maintaining optical fibers.

25. The optical device according to claim 24, wherein the third arm and the polarization rotation arm are flexed a predetermined distance.

26. The optical device according to claim 25, wherein the predetermined distance is approximately 0.25 mm.

27. The optical device according to claim 21, wherein the first Mach-Zehnder and the coupler comprise an integrated planar device.

28. The optical device according to claim 27, further comprising:

a heater element disposed on the polarization rotation arm, wherein said heater element rotates a polarization state of the second polarization component by changing an optical path length of the polarization rotation arm.

29. A method for directing a polarized light signal, having a first polarization component and a second polarization component that are mutually orthogonal polarization components of said polarized light signal, said optical device including a first port, a first component port, and a second component port, said method comprising the steps of:

providing an antipodal phase generator connected to the first port, the first component port, and the second component port;

generating a first antipodal phase signal and a second antipodal phase signal from the first polarization component and the second polarization component, respectively; and selectively subtracting said first antipodal phase signal from the first polarization component and said second antipodal phase signal from the second polarization component to thereby cause a relationship to exist, wherein the polarized light signal propagates in the first port, the first polarization component propagates in the first component port, and the second polarization component propagates in the second component port without a substantial loss of spectral information.

30. The method according to claim 29, wherein the step of selectively subtracting further comprises the steps of:

directing the polarized light signal into the optical device through the first port; and splitting the polarized light signal into the first polarization component and the second polarization component and directing the first polarization component out of the first component port and the second polarization component out of the second component port.

31. The method according to claim 29, wherein the step of selectively subtracting further comprises the steps of:

directing the first polarization component into the first component port and the second polarization component into the second component port; and combining the first polarization component and the second polarization component to thereby form the polarized light signal and direct the polarized light signal out of the first port.

32. The method according to claim 30, further comprising the steps of:

providing a second port connected to the optical device;

providing a Faraday Rotator assembly connected to the first component port and the second component port, wherein said Faraday Rotator assembly includes a half-wavelength plate;

providing a Mach-Zehnder device connected to said Faraday Rotator assembly; and non-reciprocally rotating the first polarization component and the second polarization component to thereby prevent a reflected polarized light signal from propagating in the first port due to destructive interference and to thereby cause said reflected polarized light signal to exit the optical device from said second port.

33. The method according to claim 30, further comprising the steps of:

providing a polarization rotation unit connected to the first component port and the second component port; and rotating a polarization state of the second polarization component to match a polarization state of the first polarization component, wherein either the first polarization component or the second polarization component are directed out of the optical device such that the optical device has a predetermined state of polarization.

34. A Mach-Zehnder optical device for directing a light signal having a first polarization state component, and a second polarization state component orthogonal to the first polarization state component, the Mach-Zehnder optical device including a first output and a second output, the Mach-Zehnder optical device comprising:

a first arm coupled to the first output, the first arm including a first polarization maintaining optical path adapted to passively propagate a first path-first polarization state component and a first path-second polarization state component, whereby the first polarization state component is directed out of the optical device via the first output; and a second arm coupled to the second output, the second arm including a second polarization maintaining optical path adapted to passively propagate a second path-first polarization state component substantially in phase with the first path-first polarization state component and a second path-second polarization state component delayed by substantially an odd multiple of $\pi$ radians with respect to the first path-second polarization state component, whereby the second polarization state component is directed out of the optical device via the second output.

35. The Mach-Zehnder optical device of claim 34, wherein the first polarization state component and the second polarization state component are wide-band signals.

36. The Mach-Zehnder optical device of claim 34, wherein the first arm includes a first polarization maintaining fiber and the second arm includes a second polarization maintaining fiber.

37. The Mach-Zehnder optical device of claim 36, wherein the first polarization maintaining fiber and the second polarization maintaining fiber have elliptical cores of different ellipticities.

38. The Mach-Zehnder optical device of claim 34, wherein the first arm and the second arm are disposed on a planar substrate.

* * * * *